United States Patent
Maierhofer et al.

(10) Patent No.: US 8,544,954 B2
(45) Date of Patent: *Oct. 1, 2013

(54) ADJUSTING DEVICE FOR A LUMBAR SUPPORT AND METHOD OF ADJUSTING A LUMBAR SUPPORT

(71) Applicant: Schukra Geraetebau GmbH, Berndorf (AT)

(72) Inventors: Gunter Maierhofer, Veitsbronn (DE); Klaus Junker, Dießen am Ammersee (DE); Frank Falster, Nürnberg (DE); Matthias Meyer, Henfenfeld (DE)

(73) Assignee: Schukra Geraetebau GmbH, Berndorf (AT)

( * ) Notice: Subject to any disclaimer, the term of this patent is extended or adjusted under 35 U.S.C. 154(b) by 0 days.

This patent is subject to a terminal disclaimer.

(21) Appl. No.: 13/745,015

(22) Filed: Jan. 18, 2013

(65) Prior Publication Data

US 2013/0154326 A1    Jun. 20, 2013

Related U.S. Application Data

(63) Continuation of application No. 12/946,387, filed on Nov. 15, 2010, now Pat. No. 8,360,523.

(30) Foreign Application Priority Data

Nov. 16, 2009  (EP) .................................... 09014316

(51) Int. Cl.
    *A47C 7/46*   (2006.01)
(52) U.S. Cl.
    USPC ..................... 297/284.4; 297/284.7

(58) Field of Classification Search
    USPC ........................... 297/284.4, 284.7
    See application file for complete search history.

(56) References Cited

U.S. PATENT DOCUMENTS

| 5,217,278 | A | * | 6/1993 | Harrison et al. | ........... 297/284.7 |
| 6,050,641 | A | * | 4/2000 | Benson | .................... 297/284.4 |

(Continued)

FOREIGN PATENT DOCUMENTS

| DE | 3407664 | 9/1985 |
| DE | 10142795 | 3/2003 |

(Continued)

OTHER PUBLICATIONS

EP 09014316.5 Extended European Search Report and Opinion dated Feb. 24, 2010 (5 pages).

*Primary Examiner* — Rodney B White
(74) *Attorney, Agent, or Firm* — Michael Best & Friedrich LLP (57) ABSTRACT

An adjusting device for a lumbar support comprises a pair of spaced guide members, an adjusting member coupled to the pair of guide members, and a drive mechanism for effecting an adjustment of the lumbar support. The adjusting member is displaceable along the pair of guide members and configured such that the lumbar support is adjusted when the adjusting member is displaced. The drive mechanism comprises a motor, which is provided on the adjusting member so as to be displaceable along the guide members jointly with the adjusting member. The motor may be coupled to a shaft having a structured exterior surface, the drive mechanism being configured to effect a relative displacement between the adjusting member and the shaft.

20 Claims, 5 Drawing Sheets

(56) References Cited

U.S. PATENT DOCUMENTS

| | | | |
|---|---|---|---|
| 6,227,617 B1* | 5/2001 | von Moller | 297/284.4 |
| 6,616,227 B2* | 9/2003 | Blendea et al. | 297/284.4 |
| 6,652,028 B2* | 11/2003 | McMillen | 297/284.4 |
| 6,676,214 B2* | 1/2004 | McMillen et al. | 297/284.4 X |
| 6,692,074 B1* | 2/2004 | Kopetzky et al. | 297/284.4 X |
| 6,712,427 B1* | 3/2004 | Bourdkane et al. | 297/284.4 |
| 6,893,089 B2* | 5/2005 | McMillen et al. | 297/284.4 |
| 6,908,153 B2* | 6/2005 | Blendea | 297/284.4 |
| 6,938,955 B2* | 9/2005 | VanSickle | 297/284.4 |
| 6,969,115 B2* | 11/2005 | Bourdkane et al. | 297/284.4 |
| 7,488,039 B2* | 2/2009 | Fischer et al. | 297/284.4 |
| 7,690,727 B2* | 4/2010 | Fischer et al. | 297/284.4 |
| 8,091,966 B2* | 1/2012 | Schweizer et al. | 297/284.7 X |
| 8,091,967 B2* | 1/2012 | Schweizer et al. | 297/284.7 X |
| 8,360,523 B2* | 1/2013 | Maierhofer et al. | 297/284.4 |
| 2002/0113471 A1* | 8/2002 | Blendea et al. | 297/284.4 |
| 2004/0084942 A1* | 5/2004 | Frank | 297/284.4 |
| 2005/0093353 A1* | 5/2005 | Schussler et al. | 297/284.4 |
| 2006/0226683 A1* | 10/2006 | Massara et al. | 297/284.4 |
| 2007/0102977 A1* | 5/2007 | Fischer et al. | 297/284.4 |
| 2007/0216207 A1* | 9/2007 | Stossel et al. | 297/284.4 |
| 2009/0008976 A1* | 1/2009 | Weinmueller | 297/284.4 |

FOREIGN PATENT DOCUMENTS

| | | |
|---|---|---|
| DE | 20313925 | 10/2004 |
| DE | 20316371 | 12/2004 |
| DE | 102005027922 | 1/2007 |
| EP | 2039270 | 3/2009 |
| GB | 2150020 | 6/1985 |
| WO | 85/00736 | 2/1985 |
| WO | 03/031222 | 4/2003 |
| WO | 2005/077705 | 8/2005 |
| WO | 2006/123990 | 11/2006 |

* cited by examiner

ADJUSTING DEVICE FOR A LUMBAR SUPPORT AND METHOD OF ADJUSTING A LUMBAR SUPPORT

CROSS REFERENCE TO RELATED APPLICATIONS

This application claims the benefit of and priority to European Patent Application No. 09 014 316.5, filed Nov. 16, 2009, the entire contents of which are incorporated herein by reference.

The invention relates to an adjusting device for a lumbar support and a method of adjusting a lumbar support. The invention relates in particular to an adjusting device and a method for adjusting a lumbar support that may be provided in a backrest of a vehicle seat, such as an automotive vehicle seat.

Lumbar supports are frequently provided in seat backrests in order to provide adequate support in the lumbar vertebral or lordosis region of a person sitting on the seat by forming a suitable support surface. The lumbar support frequently has a support basket or other support member that is attached to a frame arranged in the seat backrest. By means of an adjusting device the curvature or convexity of the support basket may be adjusted. Alternatively or additionally, the position of the support basket along the longitudinal, i.e. height, direction of the backrest may be adjusted. An adjustment of the lumbar support may be effected by means of a manual actuator or by means of a power actuator, which may comprise an electric motor. Lumbar supports may also be implemented as four-way lumbar supports that allow both a curvature and a position of the lumbar support to be adjusted, in order to provide for enhanced comfort. Examples for adjusting devices that provide excellent support to the person sitting on the seat are, for example, known from WO 2005/077705 A1 or from DE 10 2005 027 922 B3.

In order to provide enhanced convenience to the user, the lumbar support may be adjusted using a power actuator, which may include an electric motor. In conventional adjusting devices, the power actuator may be coupled to the lumbar support by means of a Bowden cable. The Bowden cable may be coupled to the lumbar support, so as to exert traction onto portions of the lumbar support for adjustment. Electric motors and/or pulleys are required that are dimensioned so as to provide a force or torque that allows a Bowden cable wire to be drawn in or to be played out, even under load conditions. Correspondingly, an installation space required for installing the electric motor or pulley must have a size sufficient for housing such components. The electric motor or pulley may need to be installed spaced from the lumbar support, which may make installation more complex.

There is a need in the art for an improved adjusting device for adjusting a lumbar support and an improved method of adjusting a lumbar support. In particular, there is a need in the art for an adjusting device and method in which the installation space may be reduced. There is further a need in the art for an adjusting device and method that allow a lumbar support apparatus having an adjustable lumbar support device to be easily installed in a seat backrest, for example in a vehicle seat backrest.

According to the invention, this need is addressed by an adjusting device for a lumbar support and a method of adjusting a lumbar support as defined in the independent claims. Further, a lumbar support apparatus comprising an adjusting device is provided. The dependent claims define preferred or advantageous embodiments.

An adjusting device for a lumbar support according to an aspect of the invention comprises a pair of spaced guide members, an adjusting member coupled to the pair of guide members, and a drive mechanism for effecting an adjustment of the lumbar support. The adjusting member is displaceable along the pair of guide members and configured such that the lumbar support is adjusted when the adjusting member is displaced. The drive mechanism comprises a motor, which is provided on the adjusting member so as to be displaceable along the guide members jointly with the adjusting member.

In the adjusting device, as the motor is arranged on the adjusting member, it is not necessary to provide a dedicated installation space for installing the motor at a fixed location in a seat. As the motor is provided so as to be displaceable along the guide members jointly with the adjusting member, the motor may move along a portion of the backrest, jointly with the adjusting member, which has to be kept clear of fixed components to allow displacement of the adjusting member.

The drive mechanism may comprise a shaft having a structured exterior surface, e.g., a helical thread, and disposed so as to extend parallel to the guide members. The drive mechanism may be configured such that actuation of the motor effects a relative displacement of the adjusting member and the shaft along a longitudinal direction of the shaft. Thereby, a displacement of the adjusting member may be driven by the motor provided on the adjusting member, using a drive mechanism having a simple construction.

The drive mechanism may be configured to displace the adjusting member relative to the shaft. Depending on whether the shaft is attached so as to be fixed relative to the guide members, or whether the shaft is attached so as to be fixed relative to another moveable component, a motion of the adjusting member relative to the guide members or to the other moveable component may be attained.

The shaft may be flexible. The shaft may in particular be configured such that, when a normal force of about 250 N is exerted onto the lumbar support, as is the case in normal use of the lumbar support, the shaft is still elastically deformed. Thereby, the danger of breakage may be reduced.

The shaft may be attached to a mount so that it is pivotable about an axis which is perpendicular to a longitudinal axis of the shaft. Thereby, the risk of breakage of the shaft when a load acts onto the lumbar support may be reduced.

The adjusting device may comprise spaced cross members respectively extending in between the pair of guide members. The ends of the shaft may be attached to each one of the cross members. This configuration allows the adjusting member to be displaced along the shaft, while the shaft may be secured, for example, to a wire frame of the adjusting device at both of its ends. When the shaft is flexible, the risk of breakage may be reduced.

The drive mechanism may be configured to displace the adjusting member along the guide members. Thereby, the drive mechanism may realize the adjustment of the lumbar support associated with the displacement of the adjusting member. In particular, the drive mechanism may implement a height adjustment of the lumbar support.

The drive mechanism may comprise a spindle transmission. A spindle nut of the spindle transmission may be provided on the adjusting member, and the motor may be operatively coupled to the spindle nut. Thereby, a rotary output movement of the motor may be transformed into a displacement along the shaft serving as spindle. The shaft having a structured exterior surface may engage the spindle nut.

The drive mechanism may comprise at least one worm transmission, and preferably a two-stage worm transmission, which is coupled between the motor and the spindle transmission. Thereby, a desired speed reduction may be realized, and a motor providing a lower torque may be used. Constraints imposed on the motor may then be relaxed, which facilitates mounting the motor on the adjusting member.

The spindle nut of the spindle transmission may be mounted on the adjusting member so as to be pivotable relative to the adjusting member about an axis which is perpendicular to a longitudinal axis of the spindle nut. Thereby, the spindle nut may accommodate a deformation of the spindle which may occur when a normal load is applied onto the lumbar support.

At least a portion of the adjusting member may extend in between the pair of guide members, and the motor may be mounted on the portion of the adjusting member in between the pair of guide members. Thereby, the motor may be displaced through a free space in between the two guide members.

The adjusting member may have a recess for receiving at least a portion of the motor. Thereby, the combined dimensions of adjusting member and motor may be kept small.

The adjusting device may comprise a further adjusting member which is separate from the adjusting member and is displaceable along the pair of guide members. The drive mechanism may be configured so that, upon actuation of the motor, at least one of the adjusting member and the further adjusting member is displaced relative to the guide members. Thereby, a height or a curvature of the lumbar support may be adjusted.

The adjusting device may comprise a further drive mechanism comprising a further motor. The further motor may be provided on one of the adjusting member and the further adjusting member. Thereby, the further motor may also be integrated into one of the adjusting member and the further adjusting member, and no dedicated installation space has to be provided outside the adjusting device.

The drive mechanism and the further drive mechanism may be configured such that the adjusting member and the further adjusting member are displaced in the same direction along the guide members upon actuation of one of the motor and the further motor, and that the adjusting member and the further adjusting member are displaced relative to each other upon actuation of the other one of the motor and the further motor. Thereby, a four-way actuation allowing both the height and the curvature of the lumbar support to be adjusted may be implemented.

The adjusting device may comprise at least one arching member which is respectively coupled to the adjusting member and the further adjusting member. The at least one arching member may be configured to be coupled to the lumbar support such that the curvature of the lumbar support is adjusted when the curvature of the at least one arching member changes. Thereby, the curvature of the lumbar support may be adjusted by changing the curvature of the arching member. Further, the arching member may enhance sitting comfort.

The motor may be provided on the adjusting member so that it is located in between ends of the arching member, in a longitudinal direction of the guide members. In particular, the motor may be provided on the adjusting member so that it is located in between the ends of the arching member, in the longitudinal direction of the guide members, for any operation position of the adjusting member and the further adjusting member.

According to another aspect of the invention, a lumbar support apparatus is provided. The lumbar support apparatus comprises a lumbar support and the adjusting device for adjusting the lumbar support according to any one aspect or embodiment described herein.

This lumbar support apparatus has an improved adjusting device.

According to another aspect of the invention, a method of adjusting a lumbar support is provided, in which an adjusting member is displaced along a pair of guide members, to which the adjusting member is coupled, in order to adjust the lumbar support. The lumbar support is adjusted by means of a drive mechanism comprising a motor and a shaft, which may be a spindle. The shaft may be operatively coupled to the motor so that the adjusting member and the shaft are displaced relative to each other along a longitudinal axis of the shaft when the motor is actuated. The motor is provided on the adjusting member so that it is displaced along the guide members jointly with the adjusting member.

In the method, as the motor is provided so as to be displaceable along the guide members jointly with the adjusting member, the motor may move along a portion of the backrest, jointly with the adjusting member, which has to be kept clear of fixed components to allow displacement of the adjusting member. No dedicated installation space for installing the motor at a fixed location in a seat has to be provided.

According to embodiments of the invention, the method is performed using an adjusting device for adjusting the lumbar support according to any one aspect or embodiment described herein.

The devices and methods according to various embodiments may be utilized for adjusting a lumbar support in a seat backrest. In particular, the devices and methods according to the various embodiments may be utilized for adjusting a lumbar support provided in a seat backrest of a vehicle seat, in particular an automotive vehicle seat.

Additional features and advantages of the invention will become more readily appreciated from the following detailed description of preferred or advantageous embodiments with reference to the accompanying drawings, wherein.

Exemplary embodiments of the invention will now be described with reference to the drawings. While some embodiments will be described in the context of specific fields of application, such as in the context of automotive vehicle seating, the embodiments are not limited to this field of application. Further, the features of the various embodiments may be combined with each other unless specifically noted otherwise.

Figure 1:
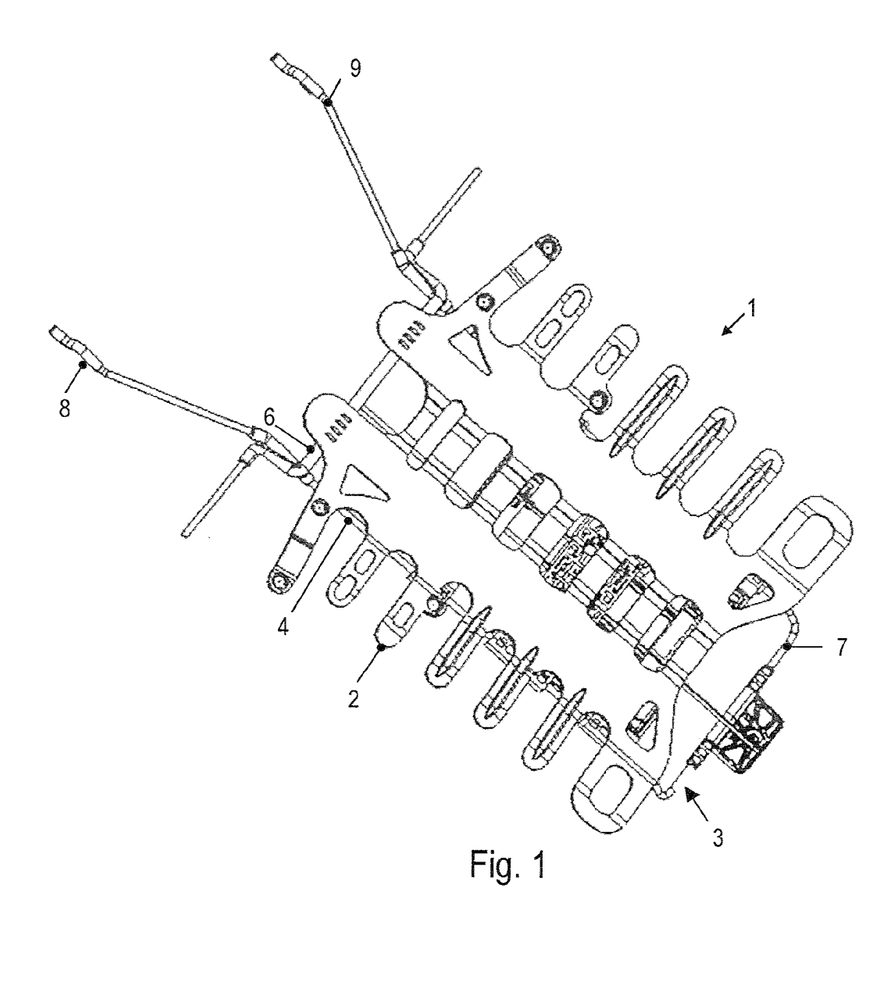
FIG. 1 is a perspective view of a lumbar support apparatus having an adjusting device according to an embodiment.
Figure 2:
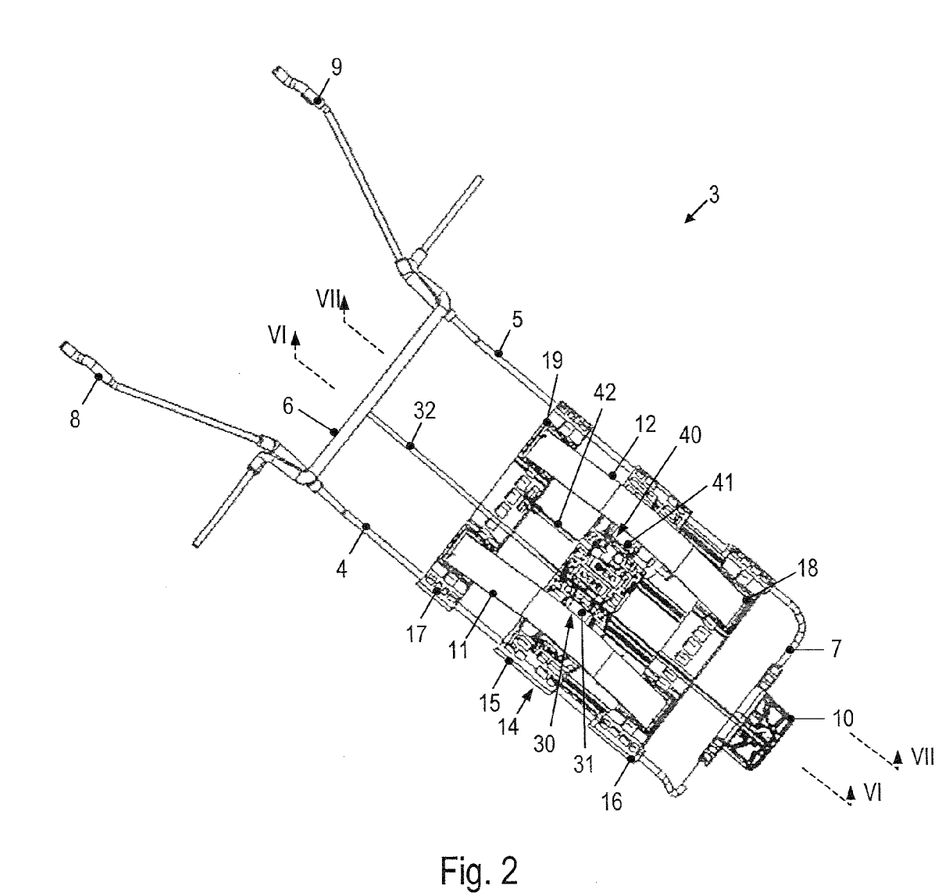
FIG. 2 is a perspective view of an adjusting device according to an embodiment.
Figure 3:
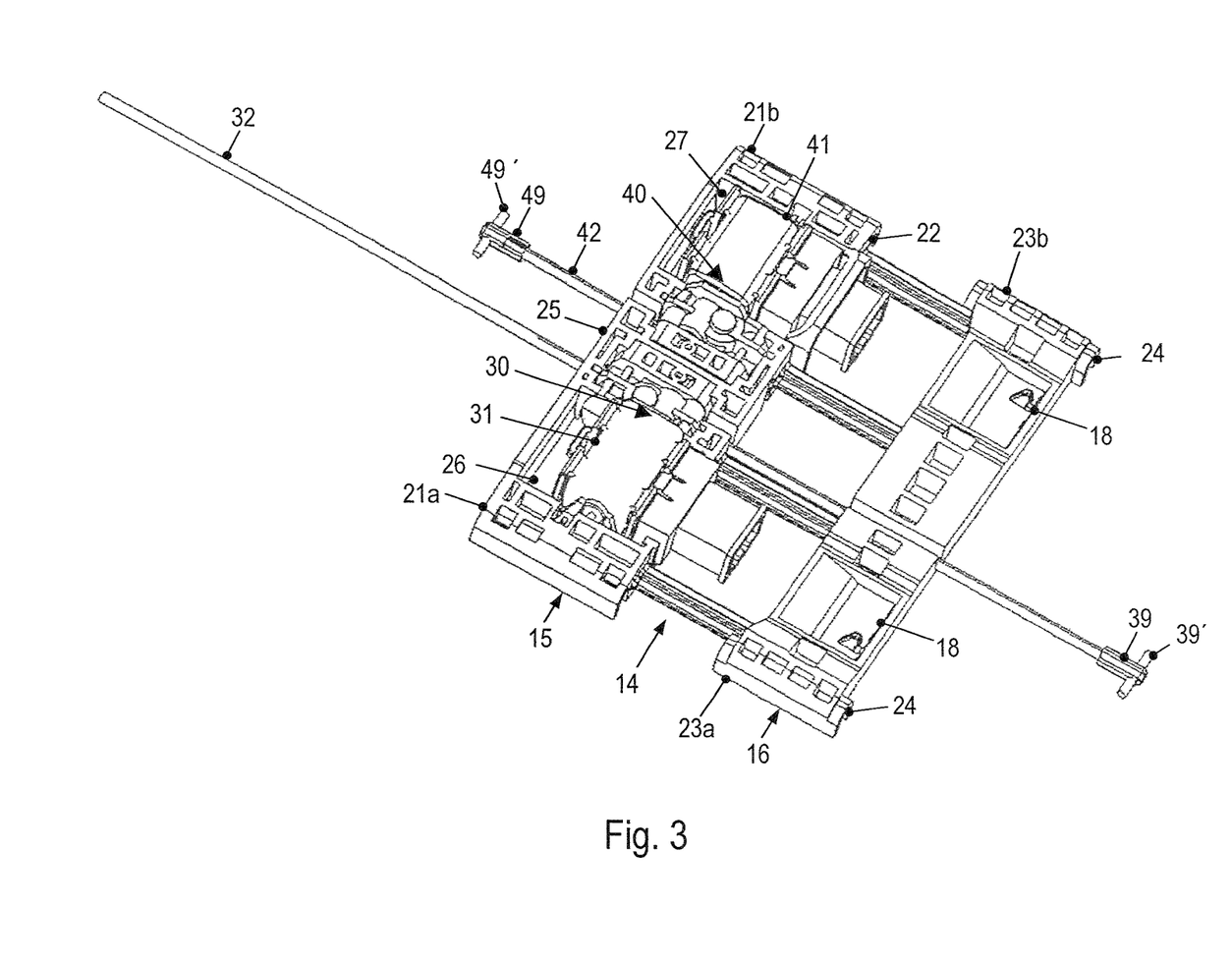
FIG. 3 is a detail view showing components of the adjusting device of FIG. 2 in detail.

FIG. 1 is a perspective view of a lumbar support apparatus 1 according to an embodiment. The lumbar support apparatus 1 comprises a lumbar support 2 and an adjusting device 3 for adjusting the lumbar support 2. The lumbar support 2 may be configured as a so-called support basket having a plurality of resilient fingers for providing support. Other suitable configurations of lumbar support members, such as support plates or similar, may also be used to implement the lumbar support 2. FIGS. 2 and 3 show the adjusting device 3 and an adjusting member 14 of the adjusting device in more detail.

When the lumbar support apparatus 1 of FIGS. 1-3 is installed in a backrest of a seat, the adjusting device 3 is operative to displace the lumbar support 2 in a longitudinal direction of a seat backrest. The adjusting device 3 is further operative to adjust a curvature of the lumbar support 2. To this end, the adjusting device 3 comprises a pair of adjusting members and two drive mechanisms that allow the pair of adjusting members to be displaced along a pair of guide elements, that extend substantially parallel and in a substantially longitudinal direction of the backrest.

The adjusting device 3 has a frame which comprises at least two guide members 4 and 5. Two cross members 6 and 7 extend in between the two guide members 4 and 5, so that the two guide members 4 and 5 are spaced relative to each other and extend essentially parallel to each other. The guide members 4 and 5 may be formed as guide wires. Extensions 8 and 9 of the frame defined by guide members 4 and 5 and the cross members 6 and 7, and extensions projecting from the cross member 6 in a width direction of the seat allow the frame defined by the guide members 4 and 5 and the cross members 6 and 7 to be mounted to the frame of a seat backrest. Several of the guide members 4, 5 and the cross members 6, 7 may be integrally formed. For illustration, the two guide members 4 and 5 and the lower cross member 7 may be formed from a wire which generally has a U-shape. Alternatively, the guide members 4, 5 and the cross members 6, 7 may be separate members that are attached to each other using suitable mounts.

Referring now to FIG. 2, the adjusting device 3 will be described in more detail. The adjusting device 3 comprises an adjusting member 14 which is supported on the guide members 4 and 5 such that it can be displaced along the guide members 4 and 5. The adjusting member 14 extends from one guide member 4 to the other guide member 5. The adjusting device 3 comprises a further adjusting member 17 which is supported on the guide members 4 and 5 such that it can be displaced along the guide members 4 and 5. The further adjusting member 17 extends from one guide member 4 to the other guide member 5. The adjusting member 14 and the further adjusting member 17 may be formed, for example, from plastic. The adjusting member 14 has a portion 15 on which components of a drive mechanism are supported, and a further portion 16 on which ends of arching members 11 and 12 are supported. The portion 15 and the further portion 16 are spaced from each other in a direction parallel to the guide members 4 and 5 at a fixed spacing. The portion 15 and the further portion 16 may be integrally formed, for example as an injection molded plastic member.

Two arching members 11 and 12 are respectively coupled to the adjusting member 14 and the further adjusting member 17. In an embodiment, recesses 18 may be provided on the portion 16 of the adjusting member 14, in which recesses 18 ends of the arching members 11, 12 are received. Another recess 19 may be provided on the further adjusting member 15 in which the other end of the arching members 11, 12 is received. The recesses 18 and 19 provided in the adjusting member 14 and the further adjusting member 17, respectively, are configured such that the ends of the arching members 11 and 12 are securely retained therein even when the adjusting member 14 and the further adjusting member 17 are moved relative to each other, or when a load is applied in a direction perpendicular to the plane defined by the guide members 4 and 5. The arching members 11 and 12 may respectively be formed of a resilient material. The arching members 11 and 12 may be configured as metal bands formed from a metal sheet.

In use of the adjusting device 3, the lumbar support 2 is coupled to the arching members 11 and 12 such that the curvature of the lumbar support 2 is adjusted when the curvature of the arching members 11 and 12 changes. Further, the lumbar support 2 is coupled to the arching members 11 and 12 such that the lumbar support 2 travels parallel to the guide members, along with the adjusting member 14, when the adjusting member 14 and the further adjusting member 17 are displaced along the guide members 4 and 5.

The adjusting device 3 comprises at least one drive mechanism configured to displace at least one of the adjusting member 14 or the further adjusting member 17 along the guide members 4 and 5. The adjusting device 3 of FIGS. 1-3 comprises a first drive mechanism 30 which is operative to displace the adjusting member 14 relative to a reference frame defined by the guide members 4, 5 and cross members 6, 7. Upon actuation of the first drive mechanism 30, the adjusting member 14 and the further adjusting member 17 are displaced along the guide members 4 and 5 in the same directions, so as to allow a height of the lumbar support 2 to be adjusted. The adjusting device 3 of FIGS. 1-3 comprises a second drive mechanism 40 which is operative to displace the adjusting member 14 and the further adjusting member 17 relative to each other. Upon actuation of the second drive mechanism 40, a spacing between the adjusting member 14 and the further adjusting member 17 is adjusted and the curvature of the arching members 11 and 12 is changed, so as to allow a curvature of the lumbar support 2 to be adjusted.

The first drive mechanism 30 includes a shaft 32 which has a longitudinal axis extending in general parallel to the guide members 4 and 5. The shaft 32 is attached at a mount 10 provided on the cross member 7 of the wire frame. The shaft 32 may in particular be attached on the mount 10 so that it is rotationally fixed about its longitudinal axis. Optionally, the shaft 32 may also be attached on the cross member 7. The first drive mechanism 30 comprises a motor 31, as can best be seen in FIG. 3. The motor 31 is mounted on the adjusting member 14 so that the motor 31 moves along the guide members 4 and 5 and the shaft 32, jointly with the adjusting member 14, when the adjusting member 14 is displaced along the guide members 4 and 5 and the shaft 32.

A transmission may be provided to couple an output of the motor 31 to the shaft 32. The transmission may be configured so as to convert a rotary movement of an output shaft of the motor 31 into a longitudinal movement of the motor 31, and the adjusting member 14 on which the motor 31 is mounted, along the shaft 32. The transmission may be implemented as a reduction mechanism which provides a speed reduction. An implementation of the transmission in an adjusting device according to an embodiment will be explained in more detail with reference to FIGS. 4 and 5, respectively.

As will also be explained in more detail with reference to FIGS. 4 and 5, the shaft 32 may have a structured exterior surface that allows the transmission to couple to the shaft 32. In an embodiment, the shaft 32 may have an external thread and may serve as spindle of a spindle transmission. The external thread of the shaft 32 may be engaged with an internal thread of a spindle nut which is driven by the motor 31 via the transmission coupled in between the spindle nut and the motor 31.

The second drive mechanism 40 comprises a shaft 42 which has a longitudinal axis extending in general parallel to the guide members 4 and 5. The shaft 42 is attached on the further adjusting member 17. The shaft 42 may in particular be attached on the further adjusting member 17 so that it is rotationally fixed about its longitudinal axis. The second drive mechanism 40 comprises a motor 41, as can best be seen in FIG. 3. The motor 41 is mounted on the adjusting member 14 so that the motor 41 moves relative to the shaft 42, jointly with the adjusting member 14, when the adjusting member 14 and the further adjusting member 17 are displaced relative to each other.

A transmission may be provided to couple an output of the motor 41 to the shaft 42. The transmission may be configured so as to convert a rotary movement of an output shaft of the motor 41 into a longitudinal movement of the motor 41, and the adjusting member 14 on which the motor 41 is mounted, relative to the shaft 42. The transmission may be implemented as a reduction mechanism which provides a speed reduction. An implementation of the transmission in an adjusting device according to an embodiment will be explained in more detail with reference to FIGS. 4 and 5, respectively.

As will also be explained in more detail with reference to FIGS. 4 and 5, the shaft 42 may have a structured exterior surface that allows the transmission to couple to the shaft 42. In an embodiment, the shaft 42 may have an external thread and may serve as spindle of a spindle transmission. The external thread of the shaft 42 may be engaged with an internal thread of a spindle nut which is driven by the motor 41 via the transmission coupled in between the spindle nut and the motor 41.

Referring to FIG. 3, a configuration of the adjusting member 14 and the first and second drive mechanisms 30, 40 in an adjusting device according to an embodiment will be described in more detail. The adjusting member 14 includes the portion 15 on which the motors 31 and 41 of the first and second drive mechanism 30 and 40, respectively, are mounted. The adjusting member 14 further includes the portion 16 which has the recesses 18, in which ends of the arching members 11 and 12 are received. Lateral side sections 21*a*, 21*b* provided on the portion 15 respectively define a recess 22 in which the guide members 4 and 5, respectively, may be received and retained. Similarly, lateral side sections 23*a*, 23*b* provided on the portion 16 respectively define a recess 24 in which the guide members 4 and 5, respectively, may be received and retained. The recesses 22 and 24 allow the adjusting member 14 to be retained on the guide members 4 and 5 in a displaceable manner. While not shown in FIG. 3, similar lateral side sections may also be provided on the further adjusting member 17.

The portion 15 of the adjusting member 14 has a central portion 25 extending between the guide members. In the central portion 25, a recess 26 is formed in which at least a portion of the motor 31 of the first drive mechanism 30 may be received. The recess 26 may be dimensioned such that the motor 31 may be fully positioned within the recess 26. Further, the transmission coupled in between the output shaft of the motor 31 and the shaft 32 of the first drive mechanism may also be positioned within the recess 26. The motor 31 and other components of the first drive mechanism 30 are mounted on the adjusting member 14 such that a force exerted onto the motor 31 in the axial direction of the shaft 32 also acts on the adjusting member 14, so as to cause the adjusting member 14 to move relative to the shaft 32.

Similarly, the central portion 25 of the adjusting member 14 has a further recess 27 in which at least a portion of the motor 41 of the second drive mechanism 40 may be received. The further recess 27 may be dimensioned such that the motor 41 may be fully positioned within the further recess 27. Further, the transmission coupled in between the output shaft of the motor 41 and the shaft 42 of the second drive mechanism may also be positioned within the recess 27. The motor 41 and other components of the second drive mechanism 40 are mounted on the adjusting member 14 such that a force exerted onto the motor 41 in the axial direction of the shaft 42 also acts on the adjusting member 14, so as to cause the shaft 42 to move relative to the adjusting member 14.

An end of the shaft 32 of the first drive mechanism 30 may be provided with an attachment member 39 for attaching the end of the shaft 32 to the mount 10. The attachment member 39 may have an external configuration that allows the shaft 32 to be attached to the mount 10 so that it is rotationally fixed about its longitudinal axis. For illustration, at least one projection 39' may be provided on the attachment member 39 that is received within a corresponding recess in the mount 10. Similarly, an end of the shaft 42 of the second drive mechanism 40 may be provided with an attachment member 49 for attaching the end of the shaft 42 to the further adjusting member 17. The attachment member 49 may have an external configuration that allows the shaft 42 to be attached to the further adjusting member 17 so that it is rotationally fixed about its longitudinal axis. For illustration, at least one projection 49' may be provided on the attachment member 49 that is received within a corresponding recess in the further adjusting member 17.

As will be appreciated, as the motors 31 and 41 of the first and second drive mechanisms, respectively, are mounted on the adjusting member 14, no dedicated installation space has to be provided for the motors 31 and 41 in a space adjacent the adjusting device 2. Rather, the motors 31 and 41 which are mounted so that they can move jointly with the adjusting member 14 are provided at a location in between the guide members 4 and 5 that has to be kept clear from stationary seat components.

As will also be appreciated, when the drive mechanisms 30 and 40 respectively comprise a spindle transmission, a rotary output movement of the motors 31 and 41, respectively, can be converted into a translatory displacement of the adjusting member 14 and/or of the further adjusting member 17. The pitch of the external thread provided on the shafts 32 and 42, respectively, may be selected so as to provide a desired conversion of the rotary output movement of the motors 31 and 41 into a linear displacement relative to the respective shafts 32 and 42, respectively.

Each one of the first and second drive mechanisms 30 and 40 may have further transmission components coupled between the output shaft of the motor and a spindle nut. Configurations of the drive mechanism that may be implemented in an adjusting device according to an embodiment will next be explained in more detail.

Figure 4:
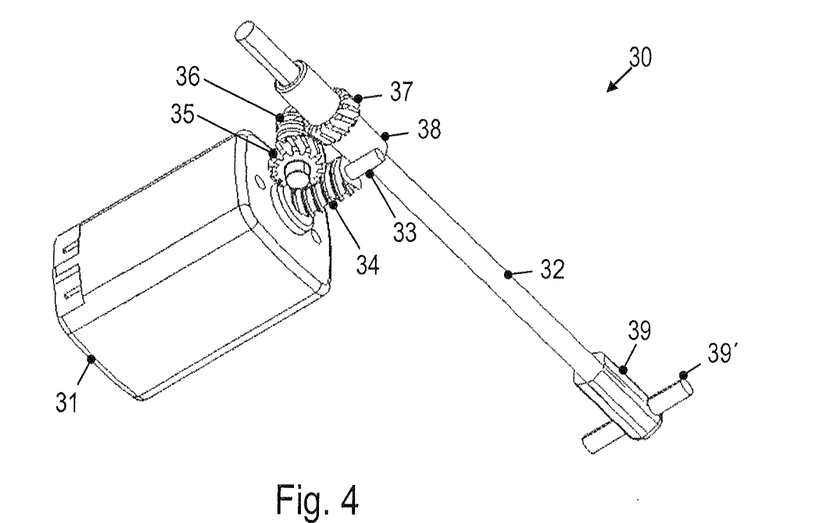
FIG. 4 is a detail view showing a drive mechanism of an adjusting device according to an embodiment in an assembled state.
Figure 5:
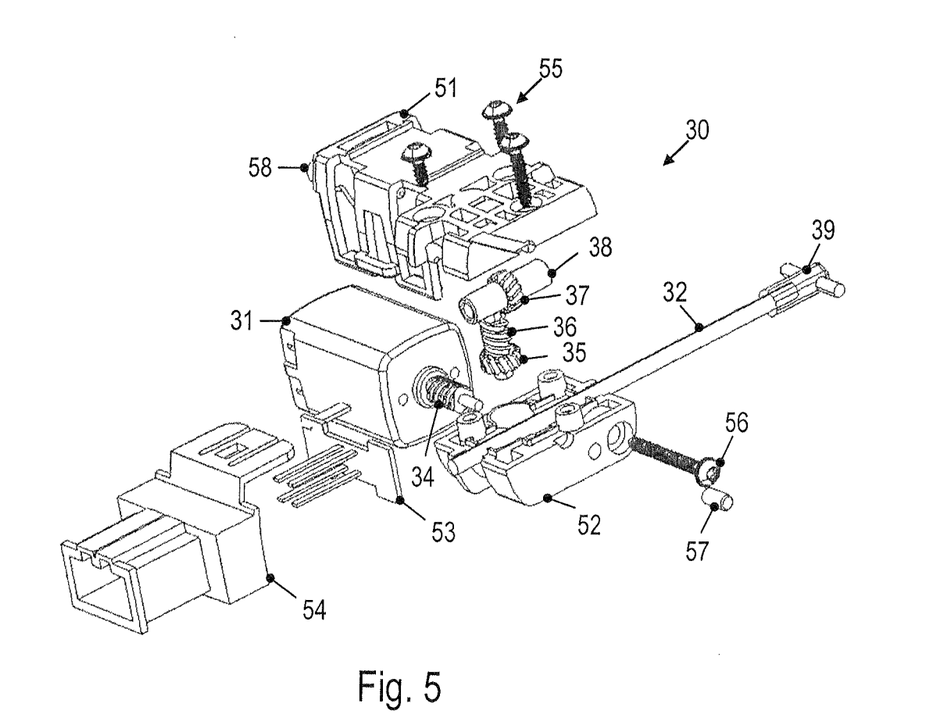
FIG. 5 is an exploded view of the drive mechanism of FIG. 4.

FIG. 4 is a partially broken away view of a drive mechanism 30, and FIG. 5 is an exploded view of the drive mechanism 30. While reference will be made to drive mechanism 30 in the following description of FIGS. 4 and 5, in an embodiment, the second drive mechanism 40 may have a configuration that corresponds to, or is identical to, the configuration of the first drive mechanism 30 explained with reference to FIGS. 4 and 5.

The drive mechanism 30 generally comprises the motor 31, the shaft 32 and a trans-mission coupled in between an output shaft 33 of the motor 31 and the shaft 32. The motor may be an electric motor. The motor may in particular be a DC motor. The trans-mission has several reduction stages. In the implementation shown in FIGS. 4 and 5, the transmission comprises a two-stage worm transmission, the output of the worm trans-mission being coupled to a spindle nut 38.

The drive mechanism 30 is configured such that a worm 34 of a first worm transmission is coupled to the output shaft 33 of the motor 31 in a rotationally fixed manner. In an embodiment, the worm 34 may be formed onto the output shaft 33 of the motor. A worm gear 35 engages the worm 34. A second worm 36 of a second worm transmission is coupled to the worm gear 35 in a rotationally fixed manner. In an embodiment, the second worm 36 and the worm gear 35 may be formed on a common shaft. A second worm gear 37 engages the second worm 36. It will be appreciated that the worm 34 and worm gear 35 engaged therewith provide a rotation speed reduction, and that the second worm 36 and the second worm gear 37 engaged therewith provide further rotation speed reduction.

The second worm gear 37 is coupled to a spindle nut 38 in a rotationally fixed manner. In an embodiment, the second worm gear 37 may be formed onto an outer surface of the spindle nut 38. A rotary movement of the output shaft 33 of the motor 31 causes the spindle nut 38 to rotate at a reduced speed, the speed reduction being effected by the two-stage worm transmission 34-37.

The spindle nut 38 has an internal thread engaging an outer thread of the shaft 32. Rotation of the spindle nut 38 effects a translatory relative displacement between the spindle nut 38, as well as the other components of the drive mechanism 30 provided on the adjusting member 14, and the shaft 32.

As can be seen from FIG. 5, the worm 34, worm gear 35, second worm 36, second worm gear 37 and spindle nut 38 are supported in a housing having housing shells 51 and 52. The housing shells 51 and 52 define recesses in which the worm 34, worm gear 35, second worm 36, second worm gear 37 and spindle nut 38 may be received so as to be rotatable. The housing shells may be attached to one another and to the motor 31 using screws 55, 56. A pin 57 may be inserted into the joined housing shells 51 and 52 along an axial extension of the output shaft 33 of the motor 31.

A connector 54 and associated circuit board 53 may be attached to the motor 31, so as to allow power to be supplied to the motor 31. If the connector 54 and circuit board 53, which defines an arrangement of connection pins, are provided so as to be removably connectable to the motor 31, the adjusting device 3 may be readily adapted for use with different power supply systems. This may be beneficial when the adjusting device 3 is to be used, for example, in different types of cars using different types of power connectors.

It will be appreciated that, for a drive mechanism having at least one worm transmission coupled between the motor and a spindle transmission, a desired speed reduction may be attained in a small installation space. This facilitates the integration of the motor and the at least one worm transmission on the adjusting member 14.

While a configuration for a drive mechanism 30 has been explained with reference to FIGS. 4 and 5, the first and/or second drive mechanism 30 and 40, respectively, may have another configuration in other embodiments. For illustration, while a drive mechanism 30 having a two-stage worm transmission is shown in FIGS. 4 and 5, the drive mechanism 30 or the drive mechanism 50 may also have a single-stage worm transmission, or at least three worm transmissions, coupled in between the motor and the spindle nut. In still further embodiments, alternative transmission mechanisms may be utilized to convert the rotary output movement of the motor into a linear movement.

Referring again to FIGS. 2 and 3, the adjusting device 3 may be configured so as to remain operative even when a force is exerted onto the lumbar support 2 in a direction that is perpendicular to the plane defined by the parallel guide members 4 and 5. In an embodiment, the adjusting device 3 is configured so as to remain operative even in the misuse case scenario, in which a normal force of 2750 N is applied to the lumbar support for test purposes. Various configurations of the shafts 32 and 42 and/or various configurations of coupling the shafts 32 and 42 to other components of the adjusting device 3 may be utilized to this end.

In an embodiment, the shaft 32 may be attached to the mount 10 so that the shaft 32 is pivotable about an axis that extends perpendicularly to a longitudinal axis of the shaft 32, i.e., perpendicularly to a longitudinal axis of the guide members 4 and 5. To this end, the attachment member 39 may be provided with pin-shaped projections 39' that extend essentially perpendicular to the longitudinal axis of the shaft 32 and which are received in corresponding recesses in the mount 10, so as to allow the shaft 32 to pivot about the axis defined by the projections 39'. Similarly, the spindle nut 38 through which the shaft 32 extends at the adjusting member 14 may be supported on the adjusting member 14 so that it is pivotable about an axis which is perpendicular to the longitudinal axis of the spindle nut 38. For a drive mechanism having the configuration of FIGS. 4 and 5, this may be attained in that the motor 31 and the transmission componentry mounted thereto in the housing 51, 52 is pivotably supported on the adjusting member 14. As indicated in FIG. 5, a projection 58 may be formed on the housing shells 51, 52, which may be received in a recess of the adjusting member 14 so as to allow the housing 51, 52 and the spindle nut 38 received therein to be pivoted relative to the adjusting member 14. When the shaft 32 has a high rigidity, the end of the shaft 32 is preferably not attached to the cross member 6. When a force is exerted onto the adjusting device 3 in a direction perpendicular to the plane defined by the guide members 4 and 5, the shaft 32 may pivot at mount 10 and the spindle nut 38 may pivot in the adjusting member 14. Thereby, transverse loads acting onto the shaft 32 may be reduced.

Similarly, the shaft 42 may be attached to the further adjusting member 17 so that the shaft 42 is pivotable about an axis that extends perpendicularly to a longitudinal direction of the shaft 42, i.e., perpendicularly to a longitudinal axis of the guide members 4 and 5. Further, a spindle nut of the drive mechanism 40, through which the shaft 32 extends at the adjusting member 14 may be supported on the adjusting member 14 so that it is pivotable about an axis which is perpendicular to the longitudinal axis of the spindle nut of the second drive mechanism 40. When a force is exerted onto the adjusting device 3 in a direction perpendicular to the plane defined by the guide members 4 and 5, the shaft 42 may pivot at its attachment to the further adjusting member 17 and the spindle nut of the second drive mechanism 40 may pivot in the adjusting member 14. Thereby, transverse loads acting on the shaft 42 may be reduced.

Alternatively or additionally, the shaft 32 and/or the shaft 42 may be formed from a flexible material, so as to allow the shaft 32 and/or the shaft 42 to be elastically deformed. In particular, the shaft 32 and/or the shaft 42 may be formed from a material that allows the shaft 32 and/or the shaft 42 to elastically deform in the misuse case scenario, in which a normal force of 2750 N is applied to the lumbar support.

For illustration, the shaft 32 and/or the shaft 42 may be a so-called flexible shaft or flex-shaft which is provided with an outer thread. The flexible shaft may have a metal core comprising a plurality of metal wires. The flexible shaft may have an external thread. The flexible shaft may have a metal wire helix on its outer surface for forming the external thread. The flexible shaft may be a flex-shaft which is available, for example, from Otto Suhner AG.

In order to be elastically deformable in the misuse case, the shaft 32 and/or the shaft 42 may be a flexible shaft adapted to elastically deform up to a maximum axial load of at least 200 N. In particular, the shaft 32 and/or the shaft 42 may be a flexible shaft adapted to elastically deform up to a maximum axial load of at least 400 N. In particular, the shaft 32 and/or the shaft 42 may be a flexible shaft adapted to elastically deform up to a maximum axial load of at least 500 N.

It will be appreciated that, when the shaft 32 or 42 is attached so that it is pivotable about an axis perpendicular to the longitudinal axis of the respective shaft, the risk of the respective shaft being damaged when a force is applied in a direction normal to the plane defined by the guide members is reduced. Additionally or alternatively, when the shaft 32 or 42 is a flexible shaft, the risk of the respective shaft being damaged when a force is applied in a direction normal to the plane defined by the guide members is reduced. Still further, in the latter case, the risk of biting between the internal thread of the spindle nut and the shaft 32 or 42 may be reduced.

It will also be appreciated that, if the shaft 32 is a flexible shaft, the shaft may be attached to both cross members 6 and 7, as the shaft 32 is capable of being elastically deformed for loads that are normally expected to occur.

Figure 6A:
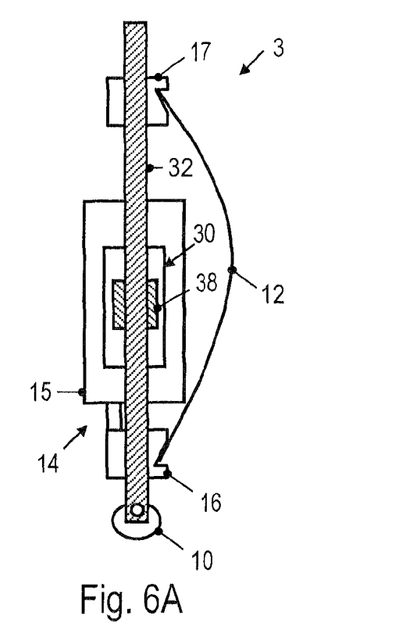
FIGS. 6A and 6B are schematic views for illustrating the operation of the adjusting device according to an embodiment.
Figure 6B:
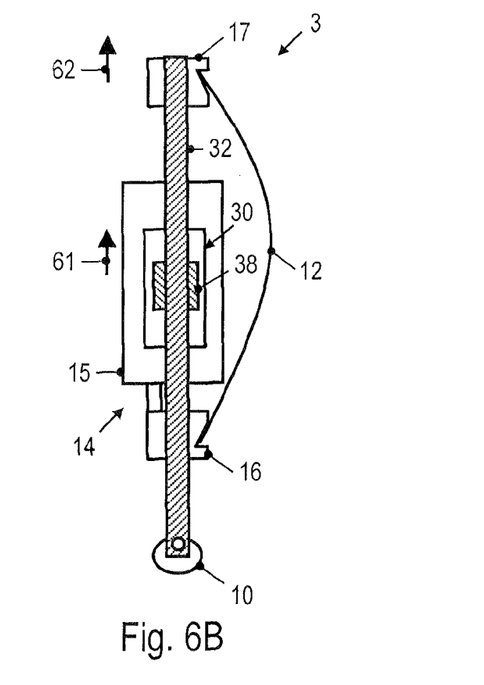
Figure 7A:
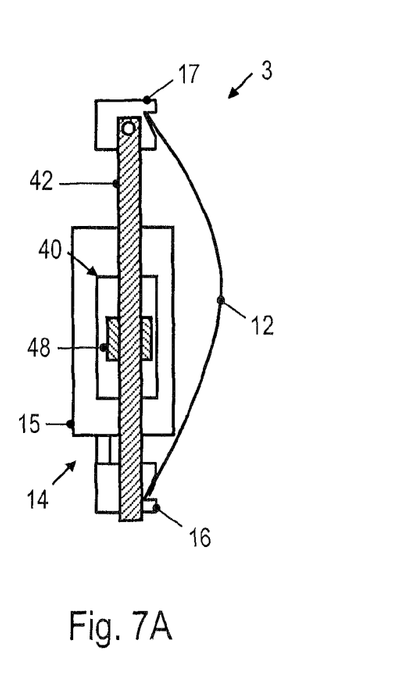
FIGS. 7A and 7B are schematic views for further illustration of the operation of the adjusting device according to an embodiment.
Figure 7B:
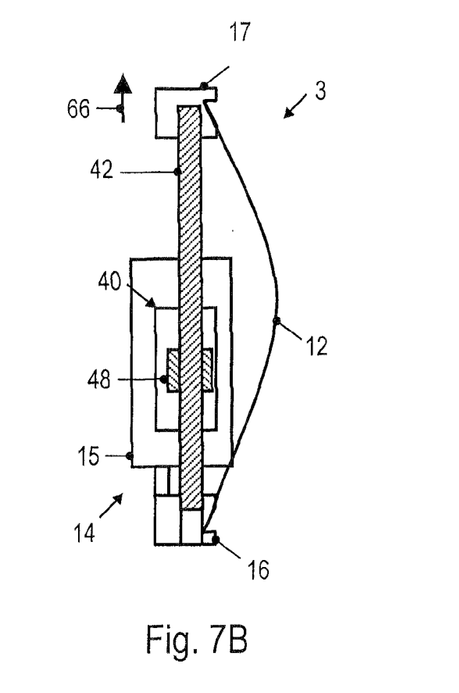

Referring to FIGS. 6 and 7, the operation of an adjusting device according to an embodiment will be explained in more detail. The operation illustrated in FIGS. 6 and 7 may be implemented with the adjusting device according to any one embodiment explained with reference to FIGS. 1-5 above.

With reference to FIG. 6, operation of the first drive mechanism 30 will be explained. FIGS. 6A and 6B are schematic sectional views showing the adjusting member 14 having portions 15 and 16, the further adjusting member 17 and the first drive mechanisms 30 of an adjusting device 3, the section being taken along the lines VI-VI indicated in FIG. 2. The adjusting member 14 and the further adjusting member 17 are attached to guide members (not shown in FIG. 6) which generally extend parallel to the shaft 32 of the drive mechanisms 30, so that the adjusting member 14 and the further adjusting member 17 may be displaced along the guide members. Further, the shaft 42 of the second drive mechanism (not shown in FIG. 6) is mounted to the further adjusting member 17 and engages a transmission, e.g., a spindle nut of the drive mechanism 40, mounted on the portion 15 of the first adjusting member 14. The further adjusting member 17 has a through opening that allows the shaft 32 to pass through the further adjusting member 17 and to be freely displaced relative to the further adjusting member 17.

FIG. 6A shows the adjusting device 3 in an initial state. The shaft 32 has a structured exterior surface which engages a member 38 of a transmission of the first drive mechanism 30. The member 38 has a structured interior surface which is engageable with the exterior surface of the shaft 32. The shaft 32 may be a spindle of a spindle transmission. The member 38 may be a spindle nut. When the motor 31 of the first drive mechanism 30, which is mounted on the adjusting member 14, is actuated, the member 38 is made to rotate. The engagement between the structured interior surface of the member 38 and the structured exterior surface of the shaft 32 causes the member 38 and the shaft 32 to move relative to each other.

The drive mechanism 30 is mounted on the adjusting member 14 such that, when the member 38 of the drive mechanism 30 moves relative to the shaft 32, the adjusting member 14 is forced to move relative to the shaft 32. This is indicated by 61 in FIG. 6B. As an end of the shaft 32 is fixed to the frame defined by the guide member 4 and 5, the adjusting member 14 is displaced along the guide members 4 and 5 upon actuation of the motor 31.

As the shaft 42 of the second drive mechanism is mounted to the further adjusting member 17 and engages a transmission, e.g., a spindle nut of the drive mechanism 40, mounted on the portion 15 of the adjusting member 14, the force acting onto the adjusting member 14 also acts onto the further adjusting member 17 via the shaft 42 of the second drive mechanism 40. Thereby, the further adjusting member 17 is forced to move in the same direction and by the same amount as the adjusting member 14, as long as the second drive mechanism is not operated. The corresponding displacement of the further adjusting member 17 is indicated by arrow 62 in FIG. 6B.

By actuation of the motor 31 of the first drive mechanism 30, a joint displacement of the adjusting member 14 and of the further adjusting member 17 in the same direction along the guide member 4 and 5 may be effected, as indicated by arrows 61 and 62 in FIG. 6B.

It will be appreciated that, in the adjusting device 3, the shaft 42 of the second drive mechanism 40 is operative to couple the adjusting member 14 and the further adjusting member 17 to each other, which causes the adjusting member 14 and the further adjusting member 17 to be jointly displaced in the same direction when the motor 31 of the first drive mechanism 30 is actuated. Additionally, the shaft 42 also is operative to adjust a curvature of the lumbar support, as will be explained in more detail with reference to FIG. 7.

With reference to FIG. 7, operation of the second drive mechanism 40 will be explained. FIGS. 7A and 7B are schematic sectional views showing the adjusting member 14 having portions 15 and 16, the further adjusting member 17 and the second drive mechanisms 40 of an adjusting device 3, the section being taken along lines VII-VII indicated in FIG. 2. The adjusting member 14 and the further adjusting member 17 are attached to guide members (not shown in FIG. 6) which generally extend parallel to the shaft 42 of the second drive mechanisms 40, so that the adjusting member 14 and the further adjusting member 17 may be displaced along the guide members. The shaft 42 is engaged with a transmission of the second drive mechanism 40 provided on the portion 15 of the adjusting member. The portion 16 of the adjusting member 14 has a through opening that allows the shaft 42 to pass through the portion 16.

FIG. 7A shows the adjusting device 3 in an initial state. The shaft 42 has a structured exterior surface which engages a member 48 of a transmission of the second drive mechanism 40. The member 48 has a structured interior surface which is engageable with the exterior surface of the shaft 42. The shaft 42 may be a spindle of a spindle transmission. The member 48 may be a spindle nut. When the motor 41 of the second drive mechanism 40, which is mounted on the adjusting member 14, is actuated, the member 48 is made to rotate. The engagement between the structured interior surface of the member 48 and the structured exterior surface of the shaft 42 brings about a relative displacement between the shaft 42 and the transmission member 48.

The second drive mechanism 40 is mounted on the adjusting member 14 such that, when the member 48 of the second drive mechanism 40 and the shaft 42 are displaced relative to each other, the shaft 42 is displaced relative to the adjusting member 14. As an end of the shaft 42 is attached to the further adjusting member 17, this causes the further adjusting member 17 to be displaced relative to the adjusting member 14, as indicated by 66 in FIG. 7B. The resultant change in distance between the further adjusting member 17 and the portion 16 of the adjusting member 14, on which ends of the arching members 11 and 12 are mounted, adjusts the curvature of the arching members 11 and 12.

By actuation of the motor 41 of the second drive mechanism 40, the further adjusting member 17 and the adjusting member 14 may be displaced relative to each other, as indicated by arrow 66 in FIG. 7B. Thereby, the curvature of the lumbar support 2 may be adjusted.

While the operation of the first drive mechanism 30 and the second drive mechanism 40 have been separately described with reference to FIGS. 6 and 7, respectively, the drive mechanisms 30 and 40 may also be actuated simultaneously.

While embodiments of the invention have been described with reference to the drawings, various modifications may be implemented in further embodiments. For illustration, while embodiments in which both motors 31 and 41 are provided on the adjusting member 14 disposed toward the lower end of the seat backrest have been illustrated, the motors 31 and 41 could also be provided in the further adjusting member 17 in other embodiments. In still other embodiments, the motor of a first drive mechanism, which is operative to displace the lumbar support along the longitudinal axis of the backrest, may be provided on one of the adjusting member 14 and the further adjusting member 17, while the motor of a second drive mechanism, which is operative to adjust a curvature of the lumbar support, may be provided on the other one of the adjusting member 14 and the further adjusting member 17.

While an adjusting device operative to adjust both a height and a curvature of the lumbar support has been described, in other embodiments, the adjusting device is not necessarily implemented as a four-way adjusting device. In an embodiment, the adjusting device may comprise a moveable adjusting member and a drive mechanism having a motor, which is provided on the adjusting member, the adjusting device being configured such that displacement of the adjusting member adjusts a height of the lumbar support along the longitudinal direction of the backrest. In an embodiment, the adjusting device may comprise a moveable adjusting member and a drive mechanism having a motor, which is provided on the adjusting member, the adjusting device being configured such that displacement of the adjusting member adjusts a curvature of the lumbar support. In either case, a shaft having a structured surface may be provided, which engages a transmission coupled between the motor and the shaft.

While a drive mechanism has been described in which a two-stage worm transmission is coupled between the rotary output shaft of an electric motor and a spindle transmission, in other embodiments the drive mechanism may comprise only one or at least three worm transmission stages. In other embodiments, another reduction mechanism may be provided.

While a drive mechanism has been described in which a spindle transmission is provided for converting a rotary output motion of a motor into a linear displacement relative to a shaft, other drive mechanisms may be in order to effect a height adjustment of the lumbar support and/or a curvature adjustment of the lumbar support. For illustration, a drive mechanism that employs a shaft having a toothed surface may be utilized.

While an adjusting member and further adjusting member have been described which respectively are provided with recesses in which a guide wire can be received, other suitable configurations, such as connections employing bolt- or screw-type fasteners that allow the adjusting member and/or the further adjusting member to be displaced along the guide members, may be used for attaching the adjusting member and/or the further adjusting member to guide members in other embodiments.

While a lumbar support apparatus having a lumbar support formed as a support basket has been shown in the drawings, the lumbar support may have other suitable configurations in other embodiments. In still other embodiments, the lumbar support may be formed integrally with a backrest upholstery, or with other backrest components.

While exemplary embodiments have been described in the context of lumbar support adjustment in the backrest of a vehicle seat, embodiments of the invention are not limited to this particular field of application. Rather, embodiments of the invention may be advantageously employed to adjust lumbar supports in a wide variety of seats.

The invention claimed is:

1. An adjusting device for a lumbar support, comprising:
   a pair of spaced guide members;
   an adjusting member coupled to said pair of guide members, said adjusting member being displaceable along said pair of guide members and configured such that said lumbar support is adjusted when said adjusting member is displaced; and
   a drive mechanism for effecting an adjustment of said lumbar support, said drive mechanism comprising:
      a motor provided on said adjusting member so as to be displaceable along said guide members jointly with said adjusting member; and
      a spindle transmission, said spindle transmission comprising a spindle nut threadingly engaged with a shaft, said spindle nut being provided on said adjusting member.

2. The adjusting device of claim 1, said shaft being disposed so as to extend substantially parallel to said guide members, said drive mechanism being configured such that actuation of said motor effects a relative displacement of said adjusting member and said shaft along a longitudinal direction of said shaft.

3. The adjusting device of claim 2, wherein said drive mechanism is configured to displace said adjusting member relative to said shaft.

4. The adjusting device of claim 1, wherein said shaft is flexible.

5. The adjusting device of claim 1, further comprising:
   spaced cross members respectively extending in between said pair of guide members, wherein ends of said shaft are attached to each one of said cross members.

6. The adjusting device of claim 1, wherein said drive mechanism is configured to displace said adjusting member along said guide members.

7. The adjusting device of claim 1, wherein said shaft is mounted so as to be pivotable about an axis which is perpendicular to a longitudinal axis of said shaft.

8. The adjusting device of claim 1, wherein said drive mechanism further comprises:
   at least one worm transmission which is coupled between said motor and said spindle transmission.

9. The adjusting device of claim 1, wherein said spindle nut of said spindle trans-mission is mounted on said adjusting member so as to be pivotable relative to said adjusting member about an axis which is perpendicular to a longitudinal axis of said spindle nut.

10. The adjusting device of claim 1, further comprising:
    a further adjusting member which is displaceable along said pair of guide members, wherein said drive mechanism is configured so that, upon actuation of said motor, at least one of said adjusting member and said further adjusting member is displaced relative to said guide members.

11. The adjusting device of claim 10, further comprising:
    a further drive mechanism comprising a further motor, said further motor being provided on one of said adjusting member and said further adjusting member.

12. The adjusting device of claim 11, wherein said drive mechanism and said further drive mechanism are configured such that said adjusting member and said further adjusting member are displaced in the same direction along said guide members upon actuation of one of said motor and said further motor, and that said adjusting member and said further adjusting member are displaced relative to each other upon actuation of the other one of said motor and said further motor.

13. The adjusting device of claim 1, further comprising:
at least one arching member which is respectively coupled to said adjusting member and said further adjusting member.

14. A lumbar support apparatus, comprising:
a lumbar support; and
the adjusting device of claim 1.

15. A method of adjusting a lumbar support, comprising
displacing an adjusting member along a pair of guide members in order to adjust said lumbar support,
said lumbar support being adjusted by means of a drive mechanism comprising a motor and a shaft, the shaft being operatively coupled to said motor so that said adjusting member and said shaft are displaced relative to each other when said motor is actuated, wherein said motor is provided on said adjusting member so that the motor is displaced along said guide members jointly with said adjusting member, said drive mechanism comprising a spindle transmission, a spindle nut of said spindle transmission being provided on said adjusting member, said spindle nut being threadingly engaged with said shaft.

16. An adjusting device for a lumbar support, comprising:
at least one guide member;
an adjusting member coupled to said at least one guide member, said adjusting member being displaceable along said at least one guide member and configured such that said lumbar support is adjusted when said adjusting member is displaced; and
a drive mechanism for effecting an adjustment of said lumbar support, said drive mechanism comprising:
a motor; and
a spindle transmission coupled to said motor, said spindle transmission comprising a spindle nut threadingly engaged with a shaft, said shaft comprising a metal core.

17. The adjusting device of claim 16, wherein said shaft is a flexible shaft.

18. The adjusting device of claim 16, wherein said metal core of said shaft comprises a plurality of metal wires.

19. The adjusting device of claim 16, wherein said shaft has an external thread formed on an outer surface of said metal core.

20. An adjusting device for a lumbar support, comprising:
at least one guide member;
an adjusting member coupled to said at least one guide member, said adjusting member being displaceable along said at least one guide member and configured such that said lumbar support is adjusted when said adjusting member is displaced; and
a drive mechanism for effecting an adjustment of said lumbar support, said drive mechanism comprising:
a motor; and
a spindle transmission coupled to said motor, said spindle transmission comprising a spindle nut threadingly engaged with a shaft, said shaft being a flexible shaft.

* * * * *